United States Patent [19]
Caragliano et al.

[11] 3,979,699
[45] Sept. 7, 1976

[54] DIRECTIONAL COUPLER CASCADING FOR SIGNAL ENHANCEMENT
[75] Inventors: Edward S. Caragliano, Poughkeepsie; Howard H. Nick, LaGrangeville, both of N.Y.
[73] Assignee: International Business Machines Corporation, Armonk, N.Y.
[22] Filed: Dec. 23, 1974
[21] Appl. No.: 535,254

[52] U.S. Cl. .................................. 333/10; 333/84 M
[51] Int. Cl.$^2$ ........................................... H01P 5/18
[58] Field of Search ....................................... 333/10

[56] References Cited
UNITED STATES PATENTS
3,146,413 8/1964 Butler ............................. 333/10 X
3,278,864 10/1966 Butler ................................. 333/10
3,863,024 1/1975 Caragliano et al ................ 333/10 X Primary Examiner—Paul L. Gensler
Attorney, Agent, or Firm—Harold H. Sweeney, Jr.

[57] ABSTRACT

A directional coupler arrangement is provided in which a plurality of directional couplers are cascaded by connecting the thru terminal of each coupler to the input terminal of the succeeding coupler and connecting the output terminal of each coupler except the last to the forward terminal of the succeeding coupler so that the desired backward coupled signal of each of the couplers arrive simultaneously at the output terminal of the last coupler so as to be additive and thereby produce an enhanced backward coupled signal. The forward coupled signals arrive at the forward terminal of the first coupler either out of coincidence or in a subtractive mode thereby minimizing the forward coupled signal.

6 Claims, 12 Drawing Figures

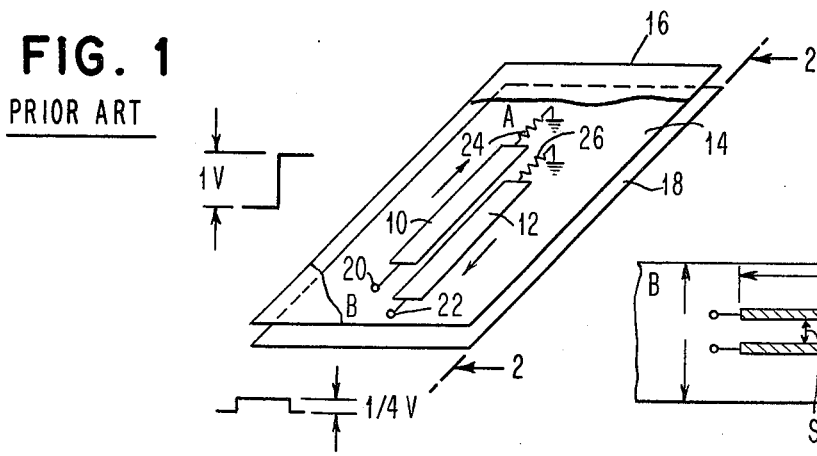
FIG. 1 PRIOR ART
FIG. 2 PRIOR ART
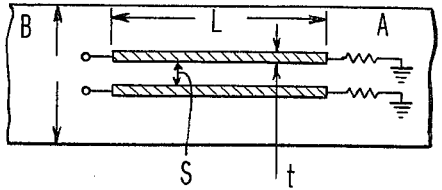
FIG. 3
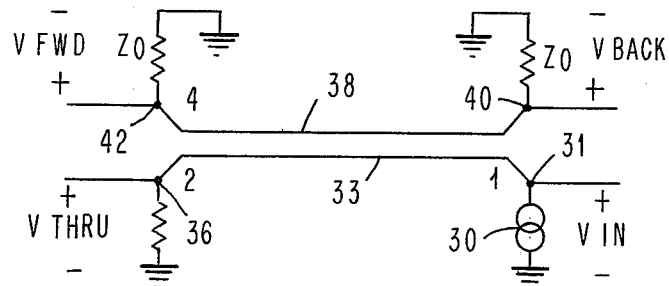
FIG. 4
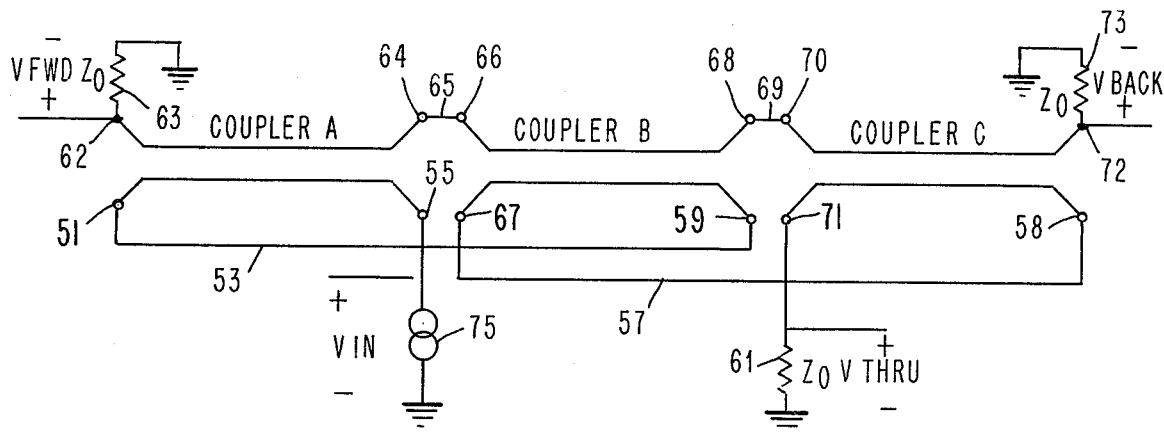
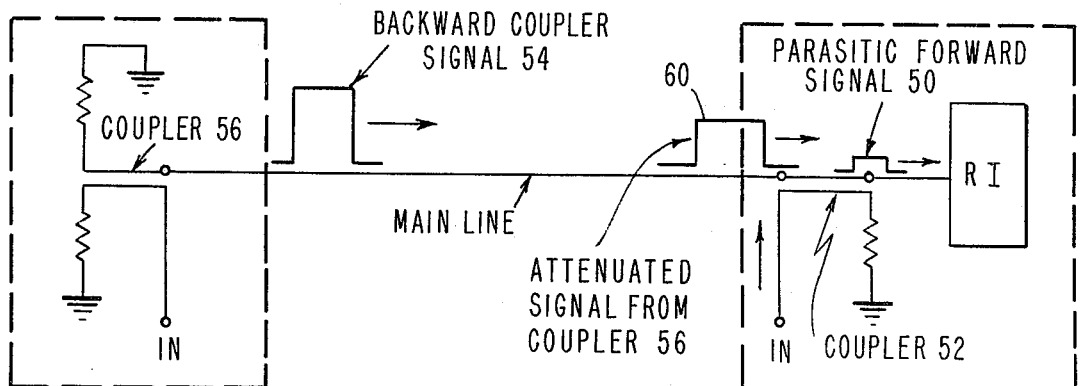
FIG. 5

$\tau = 1/4 \lambda$ SQUARE WAVE n = 2

RANDOM BI FREQUENCY CODE

DIRECTIONAL COUPLER CASCADING FOR SIGNAL ENHANCEMENT

STATEMENT OF THE INVENTION

This invention relates to directional couplers and, more particularly, to a plurality of directional couplers connected in cascade so as to enhance the desired backward coupled signal and minimize the undesired forward coupled signal.

BACKGROUND OF THE INVENTION

Directional couplers of the strip line variety are finding more applications in various industries. For example, in the computer industry it has been found that directional couplers can be used to connect signals from transmission lines to other equipment such as computer terminals without having to interrupt the line to make the connection.

A strip line directional coupler is a device wherein two parallel adjacent printed circuit strip lines sandwiched between two ground planes are inductively and capacitively coupled so that the edges of the first pulse, of fast rise and fall time characteristics, propagating along one line, produces a positive pulse and a negative pulse in the other line. The lines are back coupled or directional in that the thus produced pulses propagate along the second line in a direction opposite to the direction in which the first pulse propagates along the first line. The energy transferred between the coupling segments of the two element directional coupler is affected by the various physical characteristics of the directional coupler such as the length, width and distance between the coupling segments. The signal of interest is coupled so as to travel in the opposite or backward direction of the signal on the first line. A parasitic signal is also produced travelling along the second line in what is called the forward direction. This parasitic forward coupled signal is usually of no importance since it is usually terminated in a resistance equal to the characteristic impedance of the line to which it is connected. However, problems arise in the situation where the forward coupled parasitic signals are directed into some other device such as a receiver, as in the case of co-pending U.S. Application Ser. No. 479,935, filed June 17, 1974, now U.S. Pat. No. 3,943,283, titled Bidirectional Signal Wire Data Transmission and Wrap Control, having the same inventors. In this co-pending application directional couplers are used to connect signals onto the same transmission line going in opposite directions. It will be appreciated, that the parasitic forward coupled signal, therefore, is travelling in the same direction as a backward coupled desired signal from another coupler. This undesired signal must be minimized so that it does not cause interference at the receiver or other device at which the desired backward coupled signal is received. In many situations, it is also desirable to put onto the transmission line a backward coupled signal having as great an amplitude as possible especially where the signal is to be transmitted over long distances and is therefore, subject to the attenuation of the transmission line and interference of noise signals which are invariably introduced.

OBJECTS OF THE INVENTION

It is the main object of the present invention to provide a plurality of directional couplers connected so as to enhance the desired backward coupled signal and suppress the parasitic forward coupled signal.

It is another object of the present invention to provide improved directivity by enhancing the backward coupled signal and suppressing the forward coupled signal while using low cost directional coupler devices.

BRIEF SUMMARY OF THE INVENTION

A directional coupler arrangement is provided for improving the directivity of the signals coupled therethrough. The directivity is defined as the ratio of the backward coupled signal to the forward coupled signal. Each of the plurality of directional couplers has an input terminal, a thru terminal, a backward coupled signal output terminal, and a forward coupled signal terminal. The signal input is connected to the input terminal of the first directional coupler of the plurality of directional couplers. The thru terminal of each of the plurality of directional couplers except the last one is connected to the input terminal of the succeeding directional coupler. The backward coupled signal terminal of each of the directional couplers except the last one is connected to the forward coupled signal terminal of the succeeding directional coupler. The forward coupled signal terminal of the first coupler and the thru terminal and the backward coupled signal output terminal of the last coupler of the plurality of directional couplers include terminating means. The backward coupled signal of each directional coupler arrives simultaneously at the backward coupled signal output terminal of the last coupler so as to be additive to produce an enhanced backward coupled signal and the parasitic forward coupled signal arrives at the forward terminal of the first directional coupler either non-simultaneously or of opposite polarity so as to be subtractive and thereby minimize the parasitic forward coupled signal.

The foregoing and other objects, features and advantages of the invention will be apparent from the following more particular description of preferred embodiment of the invention as illustrated in the accompanying drawings.

BRIEF DESCRIPTION OF THE DRAWINGS

FIG. 1 is a schematic diagram of the prior art two element broadside directional coupler showing the construction thereof.

FIG. 2 is a cross-sectional diagram taken along the line 2—2 of FIG. 1 identifying the various dimensions therein.

FIG. 3 is a schematic diagram of a directional coupler identifying the various terminals thereof to be used in the invention.

FIG. 4 is a schematic diagram of the interconnection of a plurality of directional couplers to produce the improved directivity.

FIG. 5 is a schematic diagram showing the parasitic forward coupled signal generated in a bidirectional transmission system.

DESCRIPTION OF THE PREFERRED EMBODIMENT

Figure 6:
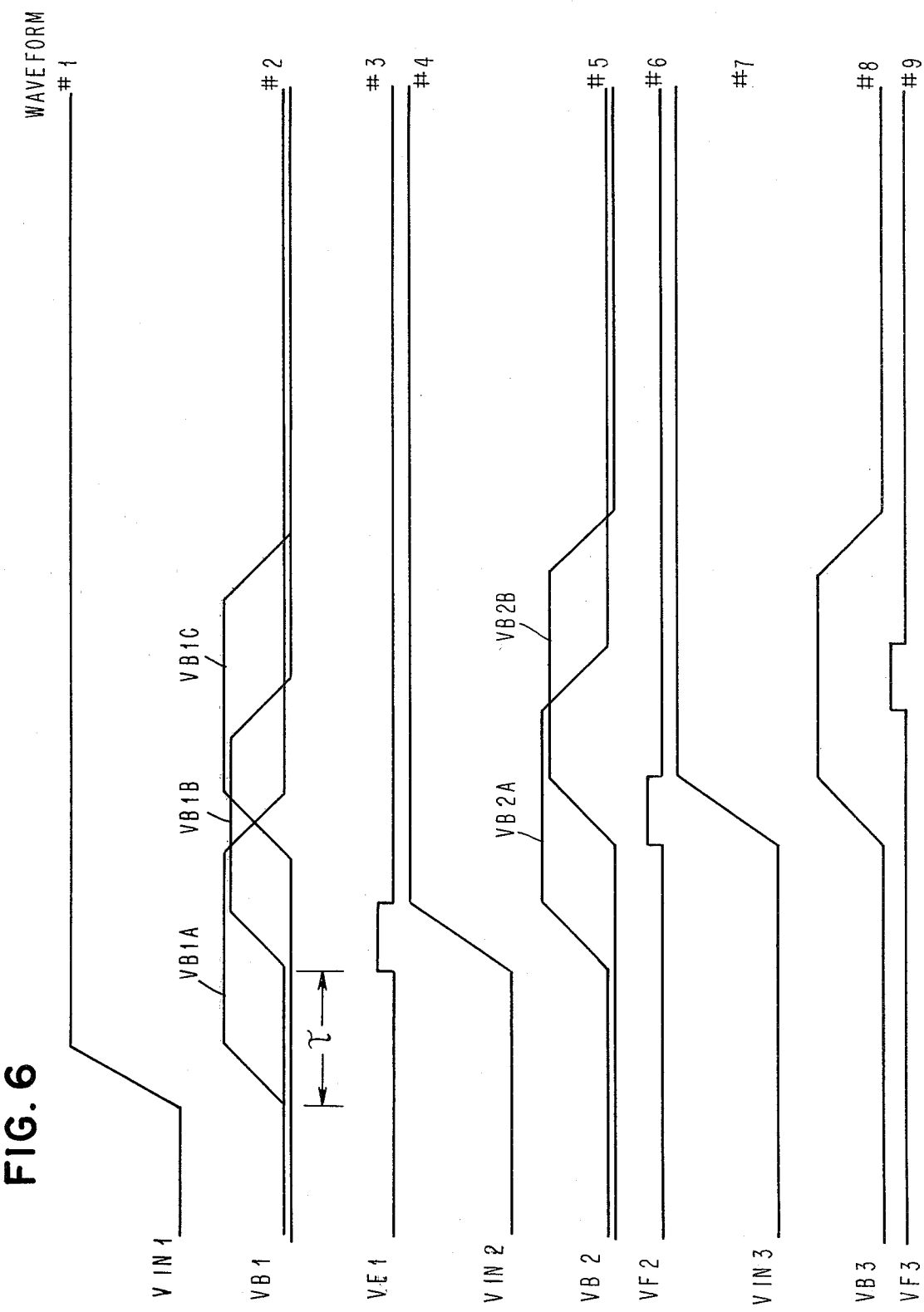
FIG. 6 is a schematic representation of the waveforms generated in the plurality of directional couplers of FIG. 4.

Referring to FIG. 1, there is shown a schematic diagram of the prior art strip line directional coupler which consists of two strip line conductive segments 10 and 12 extending parallel to and closely spaced from one another from an end A to an end B. These conductors or conductive segments 10 and 12 are located broadside to one another and closely spaced. Usually, the conductors are mounted in a substrate 14 made of a dielectric material such as epoxyglass and are arranged between two ground plates 16 and 18 which usually consist of sheets of copper arranged on either side of the pair of conductors. Each conductive element 10 and 12 has a terminal 20, 22 at the end B of the coupler serving as an input or output terminal. Each conductor 10, 12 has a terminating resistance 24, 26 connected at the A end of the coupler which matches the coupler to the characteristic impedance of the line to which it is connected. The coupling takes place along the length of the segments 10, 12. The coupler operation as defined depends upon the steepness of the incident pulse rise time. The width or duration of the pulse produced by the coupling is determined by the length of the two segments 10, 12. The performance of the coupler is described by the impedances offered to signals on the transmission line and the coupling ratio, which are determined by the widths of the lines in the coupled region, the thickness of the lines, the distance between ground planes, the distance between conductive elements, and the relative dielectric constant of the material. It has been determined that coupling segments of electrical lengths L will produce a pulse having a time duration equal to $2L$. For example, a one volt amplitude ideal step function input signal applied to the input terminal 20 of segment 10, when the coupler has a coupling ratio of 1 to 4 and an electrical length L of 2 nanoseconds, will produce an output pulse having a time duration of 4 nanoseconds and pulse amplitude of one quarter of a volt. As is shown in FIG. 1 by arrows, the coupled pulse travels in an opposite direction in the conductive segment 12 to the direction of travel in the coupling segment 10. Hence, the desired pulse in the coupler is called the backward coupled pulse and pulses coupled in the second segment in the forward direction are called the forward coupled pulses. It will be appreciated, that either of the conductive segments 10 and 12 can serve as the input and likewise the other would serve as the output. A strip line coupler is operated by the edge of the wave passing along one of the lines and this wave edge should have a rise or fall time that is twice as fast as the time duration of the pulse induced by coupling in order that the relationship of the height of the induced pulse be related to the height of the driving pulse in the manner defined by the coupling ratio. The various critical dimensions of the directional coupler for proper operation are indicated in the cross-sectional diagram of the prior art directional coupler shown in FIG. 2.

FIG. 3 shows a schematic diagram of a directional coupler wherein the input pulse is represented as being generated by a generator 30 connected to terminal 31, the input terminal, of the directional coupler. This input pulse Vin travels along the coupling element 33 to terminal 36 sometimes referred to as the Vthru terminal. The pulse applied at input terminal 31 is shown in Vin1 of FIG. 6. The coupling to element 38 begins as the input pulse starts to travel along the element 33. The resulting backward coupled pulse VBack is generated at terminal 40 known as the VBack terminal. This backward coupled pulse VBack is shown in FIG. 6 as VB1A. A parasitic forward coupled pulse VFwd is also coupled into coupling element 38 but going in the opposite direction. This parasitic forward coupled pulse leaves the coupler at terminal 42, which is known as the VFwd terminal. All the terminals except the input terminal include a resistor connected from the terminal to ground which is of a value equal to the characteristic impedance of the line to which the terminal is connected. The forward coupled pulse VFwd is shown in FIG. 6 as waveform VF1. It can be seen that the VF1 signal appears $\tau$ ns (nanosecond) after the VB1A signal where $\tau =$ electrical length of the coupler. Furthermore, the width of the VF1 pulse equals the rise time of the input signal, whereas the width of the VB1A signal is 2 times $\tau$ pulse the rise time of the Vin signal. The directivity of the coupler $$D = \frac{|V\text{Back}|}{|V\text{Fwd}|}.$$

The directivity $D$ of a directional coupler is ideally infinity; i.e., $V\text{Fwd} = 0$. This occurs if $Lm/Cm = ZO^2$ where $Lm$, $Cm$ and $ZO$ are respectively mutual inductance, mutual capacitance and the characteristic impedance of the coupler. Given an imbalance of $Lm$ or $Cm$ and an input with a finite rise time, the amplitude of the Fwd coupled pulse is proportional to the imbalance in $Lm$ and $Cm$ and the input rise time while the width of the Fwd coupled pulse equals the rise time of the input.

The importance of directivity in a directional coupler can best be seen by referring to FIG. 5 where there is shown a bi-directional transmission system utilizing directional couplers to place information on and remove information from the transmission line. It can be seen that the parasitic forward coupled signal 50 of directional coupler 52 is actually noise travelling in a direction towards receiver R1. The backward coupled signal 54 from coupler 56 is transmitted along the main transmission line toward the receiver R1. It should also be noted that this signal is attenuated as it travels along the transmission line. The parasitic forward signal 50, if of sufficient amplitude, can be misinterpreted by the receiver R1. Thus, in a bi-directional system schematically shown in FIG. 5, it is important that any backward coupled signal generated by coupler 56 travelling towards coupler 52 be of sufficient amplitude to be detected at receiver R1 in spite of the noise or parasitic forward signal generated by coupler 52. Similarly, the parasitic forward signal 50 travelling toward R1 from coupler 52 should be maintained as small as possible. Actually, the attenuated signal 60 from coupler 56 travelling toward receiver R1 is related in amplitude to the parasitic signal 50 produced by coupler 52 by two parameters. The first is the attenuation introduced by the cable connecting the two couplers 52 and 56 while the second parameter is the directivity of coupler 52. It will be appreciated that the directivity of the coupler used in a bi-directional fashion will directly affect the maximum performance of the system. Directivities in the order of 50 DB backward to forward signals at 1 GHZ are common in the art. Higher directivities are more easily obtainable generally at lower frequencies. However, the generation of directional couplers having high directivity becomes very expensive. Using a directional coupler having a directivity of 40 decibels as the coupler 52 and 56, and assuming that the backward coupled signal generated by coupler 56 has been attenuated by 30DB due to the cable between the two couplers 56 and 52, at the input to receiver R1, the attenuated signal is 10DB (40-30) above the forward coupled parasitic signal generated by coupler 52. Given a further requirement of a desired signal to noise ratio of 10 to 1 or 20DB at the input to receiver R1, the directivity requirement for coupler 52 is 50 DB. For example, directivity $D = 50DB$ to overcome a 30DB (Cable Atten.) and 20DB (S/N Ratio) requirement. This is 10DB better than that which is exhibited by the coupler chosen for the example. It should be understood that although directivities of 50DB are obtainable in the art, the cost for these high directivity couplers is greater than for couplers having less directivity. For example, a coupler having a directivity of 30DB at 0.9 GHZ is approximately $125 while a coupler having a directivity of 45DB at 0.9 GHZ is approximately $850. Accordingly, the present directional coupler arrangement provides for an improved directivity by connecting low cost low directivity directional couplers together in such a way as to obtain the improved or better directivity which is usually obtainable only with higher cost directional couplers.

This improvement in the directivity of directional couplers is obtained by connecting the couplers as shown in FIG. 4. The interconnection of couplers A, B and C are shown. It will be appreciated, that theoretically any number of couplers can be connected in this manner. Each of the directional couplers utilized in FIG. 4 are identical to the directional coupler shown and described in FIG. 3. The thru terminal 51 of coupler A is connected to the input terminal 59 of coupler B by a short connecting wire 53. Similarly, the thru port 67 of coupler B is connected to the input terminal 58 of coupler C by a short connecting wire 57. The thru terminal 71 of coupler C is terminated by a resistor 61 having a value equal to the characteristic impedance ZO of the line to which the terminal is connected. Likewise, the VFwd terminal 62 of coupler A is terminated in a resistor 63 having a characteristic impedance $Z_0$ while the VBack terminal 64 of coupler A is connected by a short connector 65 to the BFwd terminal 66 of coupler B. The connector 65 should introduce approximately the same delay as connector 53. Similarly, the VBack terminal 68 of coupler B is connected to the VFwd terminal 70 of coupler C by a short connecting wire 69. Also, the VBack terminal 72 of coupler C is terminated by a resistor 73 having a value equal to the characteristic impedance ZO of the line to which it is connected.

Since the electrical length of each of the couplers is $\tau$ ns, it takes $\tau$ ns for the input signal of coupler A generated by generator 75 at input terminal 55, shown as wave-form Vin1, to travel from terminal 55 to terminal 51 of coupler A. Since connector 53, connecting terminal 51 to 59, is made sufficiently short to introduce practically no delay, the signal arriving at terminal 59 of coupler B is practically identical to the input signal Vin1 except for the $\tau$ ns time delay. Similarly, it requires $\tau$ ns for the backward coupled signal appearing at terminal 64 of coupler A (waveform VB1A) to appear at terminal 68 of coupler B (waveform VB1B). The backward coupled pulse waveform VB2A, shown on waveform 5, simultaneously appears at terminal 68 resulting from Vin2 applied at terminal 59 of coupler B. Thus, the resultant backward coupled signal at terminal 68 of coupler B is the summation of waveforms VB2A and VB1B. Similarly, the final voltage appearing at terminal 72 of coupler C is equal to the summation of VB1C + VB2B + VB3. These waveforms are shown as waveform 2, 5 and 8 respectively on FIG. 6. The resultant backward coupled voltage signal obtained at output terminal 72 has been amplified by a factor of approximately 3, where 3 is the number of couplers. Therefore, theoretically $n$ couplers should provide an amplification by a factor $n$. Significantly, however, the forward parasitic signals of the 3 couplers are not amplified since they are not coincident in time as seen through the addition of waveforms 3, 6 and 9. The amplitude of the resultant forward pulses observable at the VFwd terminal 62 of coupler A are not amplified but instead appear as 3 pulses each of whose amplitude is equal to that produced by a single directional coupler, i.e.; A, B, or C. The directivity of the cascaded couplers $$D_2 = \frac{n \times V\text{Back}}{V\text{Fwd}} = nD1.$$

In the example of FIG. 4 where $n = 3$ the increase in directivity approximately equals 9.5 DB. Similarly for:

| n | Directivity increase |
|---|---|
| 4 | 12 DB |
| 5 | 14 DB |
| . | |
| 10 | 20 DB |
| . | |

The amplification of the backward coupled pulse and the resulting enhancement in directivity are limited due to the attenuation of a backward coupled pulse and the input voltage as they proceed through additional couplers. This attenuation is related to the magnitude of the voltage coupling coefficient $k$ of a given coupler wherein the higher the $k$ the greater the attenuation.

Figure 12:
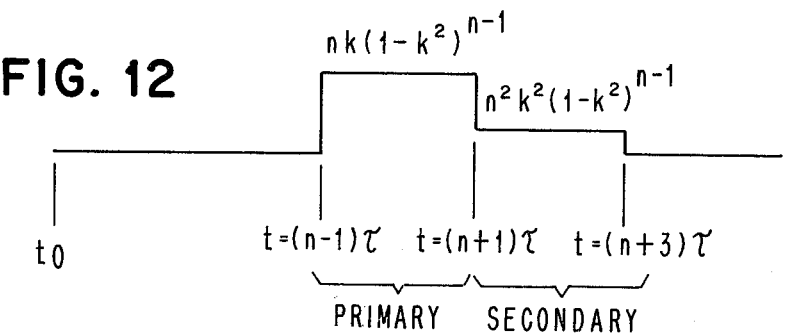
FIG. 12 is a schematic representation of the backward coupled pulse resulting from a step input to n cascaded directional couplers.

When the signal input Vin is a step input, the resultant backward coupled pulse for $n$ couplers is shown in FIG. 12. It can be deduced from the transfer functions for a directional coupler that the effective amplification of the primary backward pulse for $n$ couplers versus a single coupler is:

$$A = \frac{n k (1-k^2)^{n-1}}{k} = n(1-k^2)^{n-1}$$

The ratio of the primary backward coupled pulse to the secondary backward coupled pulse for $n$ couplers is:

$$R = \frac{n k (1-k^2)^{n-1}}{n^2 k^3 (1-k^2)^{n-1}} = \frac{1}{nk^2}$$

For example, if $k = 0.2$ then for a single coupler $R = 1/(.2)^2 = 25:1$,
and $A = 1$. Where $n = 3$, the coupler configuration produces the effective amplification: $A = 3(1-(.2)^2)^{3-1} = 2.76$. Similarly, the ratio of the primary to secondary backward coupled pulse is: $R = 1/3(0.2)^2 = 25/3 = 8.33$. The number of cascaded stages is a function of the coupling coefficient $k$, the effective amplification A required and any criteria concerning the ratio R. The following is a matrix showing the effect of $k$ and $n$ on the effective amplification A and the ratio R.

TABLE A

| n | 1 | | 2 | | 3 | | 4 | | 5 | |
|---|---|---|---|---|---|---|---|---|---|---|
| k | A | R | A | R | A | R | A | R | A | R |
| .1 | 1 | 100 | 1.98 | 50 | 2.94 | 33 | 3.88 | 25 | 3.8 | 20 |
| .2 | 1 | 25 | 1.88 | 12.5 | 2.70 | 8.3 | 3.46 | 6.25 | 4.2 | 5 |
| .3 | 1 | 11 | 1.82 | 5.5 | 2.48 | 3.7 | 3.0 | 2.5 | 3.4 | 2.2 |
| .5 | 1 | 4 | 1.5 | 2 | 1.7 | 1.3 | 1.7 | 1.0 | 1.6 | 0.8 |

Figure 7:
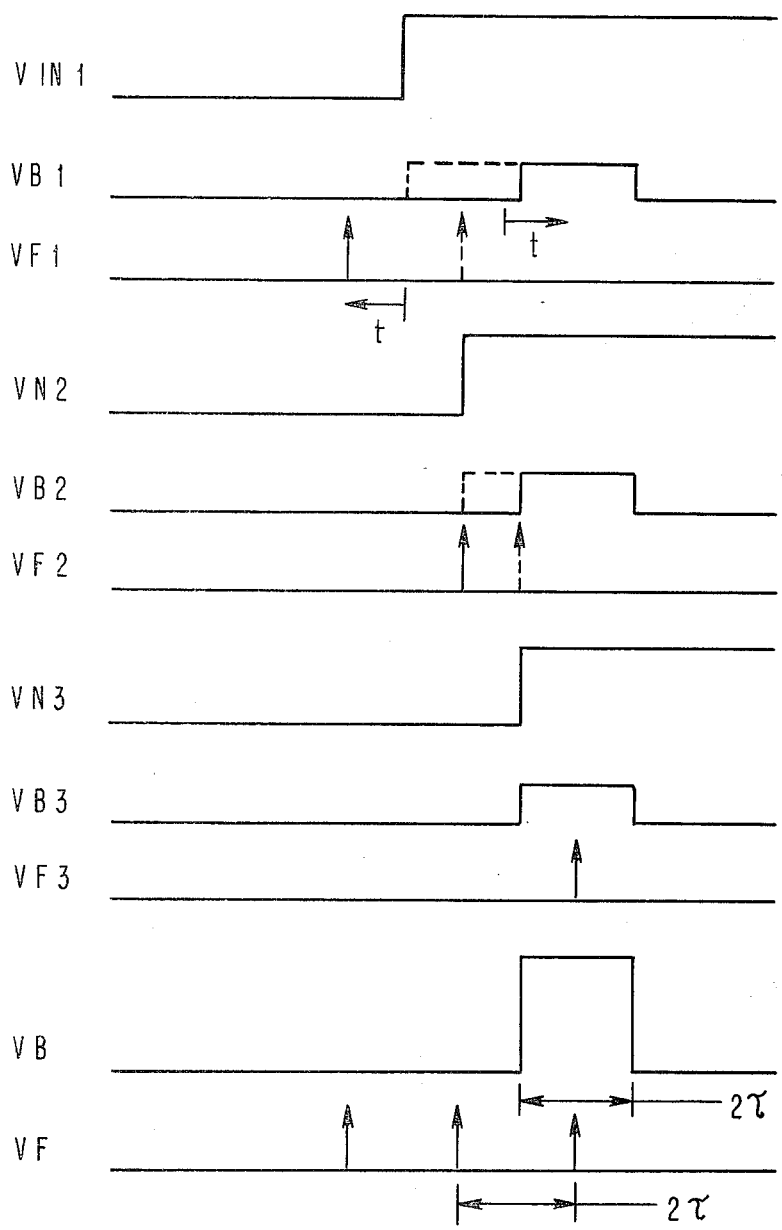
FIG. 7 is a schematic diagram of the waveforms obtained in the plurality of directional coupler arrangement of FIG. 4 with a step input signal.
Figure 8:
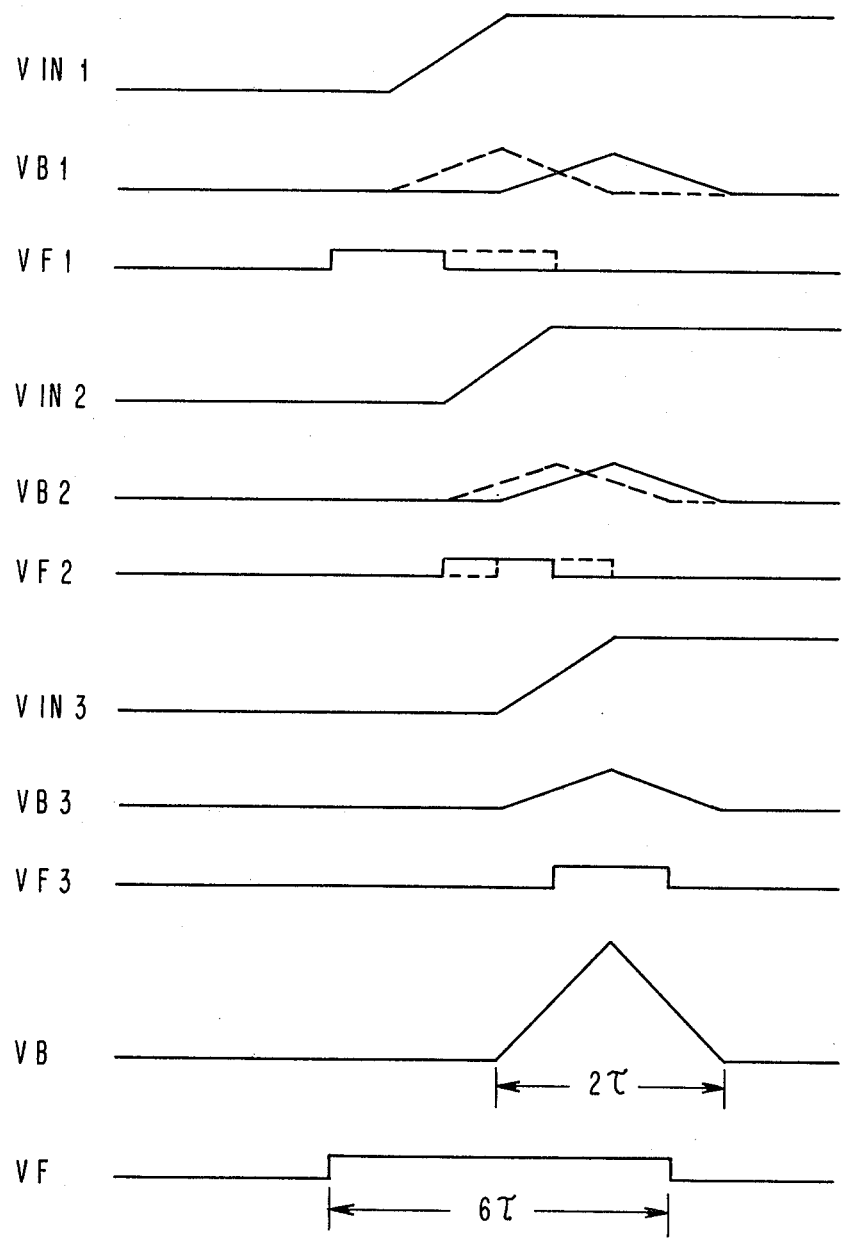
FIG. 8 is a schematic representation of waveforms obtained in the directional coupler arrangement of FIG. 4 with a ramp input equal to $2\tau$.
Figure 9:
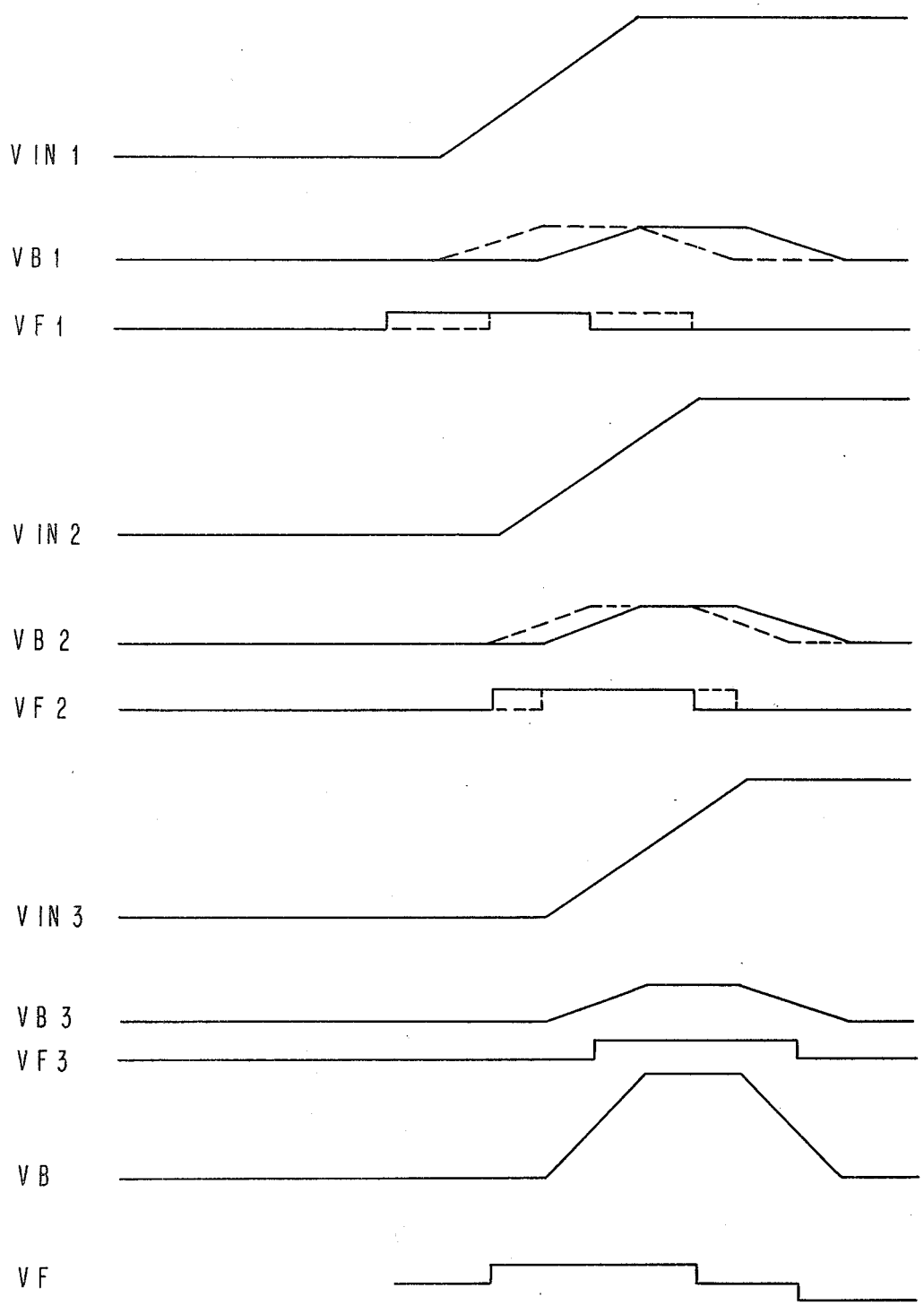
FIG. 9 is a schematic diagram showing the waveforms generated in the plurality of coupler arrangement of FIG. 4 with a ramp input whose rise time is greater than $2\tau$.

FIG. 7 shows the appropriate timing relationships in accordance with the previous example of three cascaded couplers with a step input. The arrows shown in the VF1, VF2, VF3 and VF waveforms are delta functions which are obtained as a derivative of the respective input step functions. The dotted parts of the waveforms VB1, VF1, VB2 and VF2 represent the positions of the pulses at zero time while the solid lines represent the position of the pulses at some later time. It should be noted that the VB and VF pulses move in the opposite direction, thus their time scales are reversed. For example, the dotted pulses for VB1 and VF1 are the representation of VB1 and VF1 at time zero. At time equal to 2 $\tau$, VB1 has moved 2 $\tau$ nanoseconds in one direction as represented by the solid line pulse position and VF1 has moved 2 $\tau$ ns in the opposite direction. The solid line pulse in VB1 is the pulse initiated in coupler A as it is at the backward coupled terminal of coupler C. Similarly, the pulses shown in VB2 represent in dotted line form the pulse that is generated in coupler B by the receipt at the input terminal of VN2 while the solid line pulse represents the pulse resulting at the backward coupled pulse terminal of coupler C from the backward coupled pulse operated in coupler B. The dotted line pulse of waveform VF1 represents the impulse generated in coupler A by the input Vin1 at the forward coupled pulse terminal. The solid line pulse represents the pulse received at the forward coupled pulse terminal of coupler A from coupler C. Thus, it would be delayed 2 $\tau$ ns since it has to traverse the coupler B and then A each having a $\tau$ ns delay. The same explanation can be deduced in connection with coupler B as a result of VN2. Similarly VN3 produces waveform VB3 and VF3. VB3, VB2 and VB1 are additive at the backward coupled pulse terminal of coupler C to provide the enhanced output shown as waveform VB. As was previously explained in connection with FIG. 6, the forward coupled pulses are separated, in this case by 2 $\tau$, so that they are not additive as shown in waveform VF of FIG. 7. FIG. 8 shows the timing relationship with three cascaded couplers and a ramp input equal to 2 $\tau$. FIG. 9 depicts the timing relationship of three cascaded couplers and a ramp input whose rise time is greater than 2 $\tau$.

Figure 10:
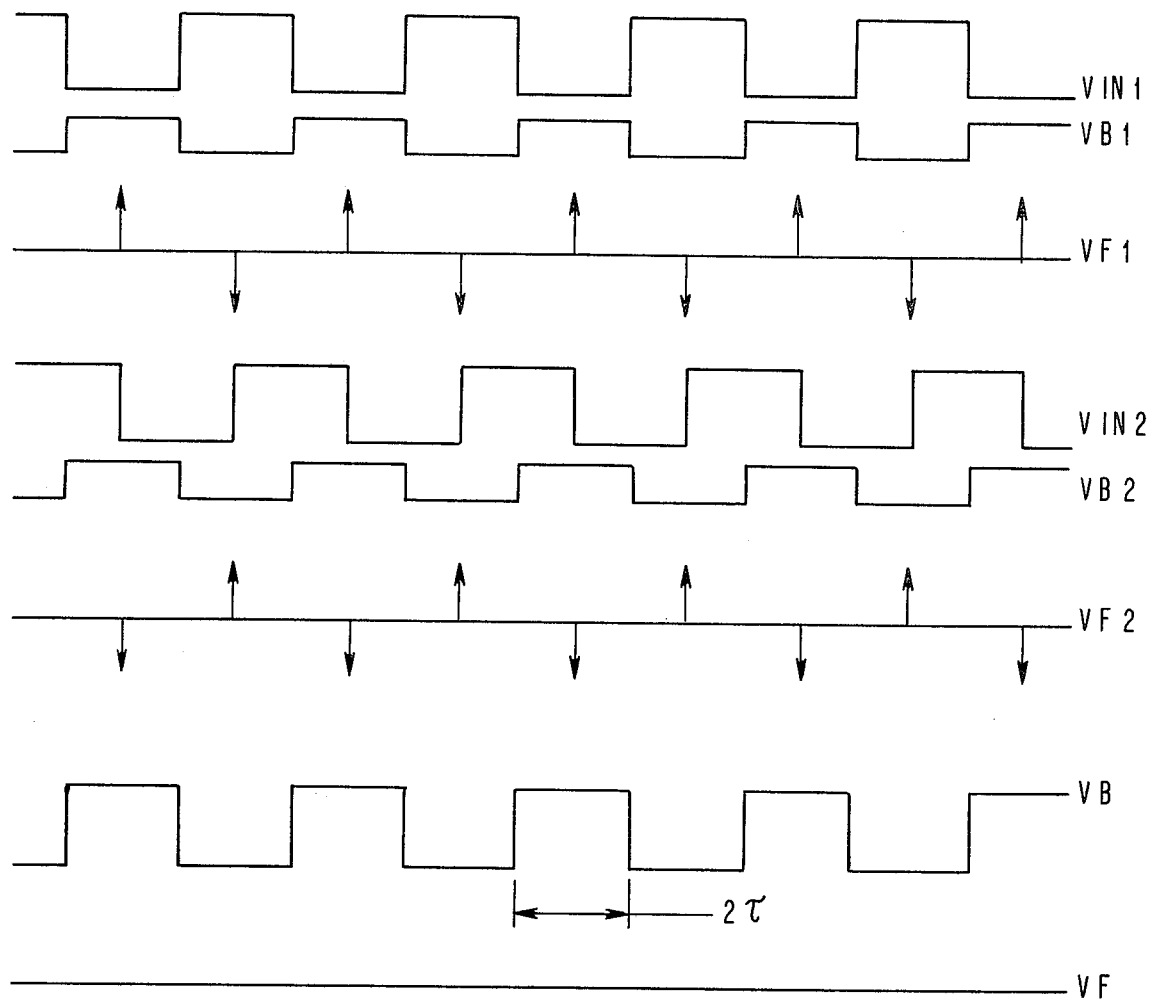
FIG. 10 is a schematic diagram showing the waveforms generated in a two coupler arrangement wherein the input is a symetrical waveform.

The embodiment described herein, when applied to symetrical periodic functions provides the maximum enhancement of directivity. In fact, infinite directivity is approached in the perfect case, wherein there is a non-ideal matching of mutual inductance Lm and mutual capacitance Cm. Referring to FIG. 10, there are shown 8 waveforms wherein the input periodic function is applied to a two cascaded coupler configuration connected in the manner previously described in connection with FIG. 4. Each of the couplers in this arrangement is tuned to ¼ λ (λ = wavelength) of the input frequency, of the periodic function. Vin1, for example, is a square wave input applied to the first coupler, and VB1 is representative of the backward coupled pulse train of the first coupler arriving at terminal 64. VF1 is the resultant parasitic forward coupled impulse train arriving at terminal 62 as the result of the coupling caused by Vin1. Vin2 represents the input waveform to the coupler B at terminal 59 which is delayed in time by $\tau$ ns from Vin1. VB2 is the resultant backward coupled pulse train of coupler No. 2 arriving at terminal 68, whereas VF2 is the resultant parasitic forward coupled impulse train of coupler B arriving at terminal 62. VB is the resultant waveform comprised of the summation of VB1 and VB2. Similarly and most significantly, VF is the resultant achieved by the addition of VF1 and VF2. It should be appreciated that there is significant cancellation of the parasitic forward coupled signal. The same condition mentioned earlier is achieved for $2n$, ... where $n = 1, 2, 3, ...$ cascaded couplers each tuned to ¼ λ of the input frequency. Similarly for $4 \times n$, ... where $n = 1, 2, 3, ...$ cascaded couplers tuned to ⅛ λ of the input frequency the cancellation condition is also achieved.

Infinite directivity cannot be achieved since the forward coupled pulses will never completely cancel because of the attenuation of the input signal as it passes through an ideal coupler and the attenuation of a coupled signal as it passes through subsequent ideal directional couplers. Referring again to FIG. 10 it will be appreciated that waveform VF1 must have an identical amplitude to waveform VF2 to completely cancel. However, VF2 will always be slightly less than VF1 since Vin2 is somewhat less than Vin1 and VF2 is attenuated by passing through coupler A. The attenuation of the forward coupled pulse VF2 as it passes through coupler A, can be minimized by keeping the coupling coefficient low since:

$$\text{Attenuation} = \sqrt{1-k^2}$$

For example, given: $k = 0.2$, $|VF1| = 1$ then $|VF2| = \sqrt{1-0.04} \times 1 = 0.98$. Thus, the magnitude of the resultant forward component is reduced to 2% of the forward component of a single coupler. Further the resultant backward component is increased by a factor of 1.96 relative to that of a single coupler. Thus the ratio of VBack/VFwd for the two coupler configuration is 98 times the same ratio for a single coupler. This is an increase of 39.8DB in directivity. For example, a single coupler with a directivity of 30DB, if connected in accordance with this invention, can increase the directivity to 70DB. The two couplers must have similarly unbalanced Lm and Cm conditions and low attenuation properties.

Figure 11:
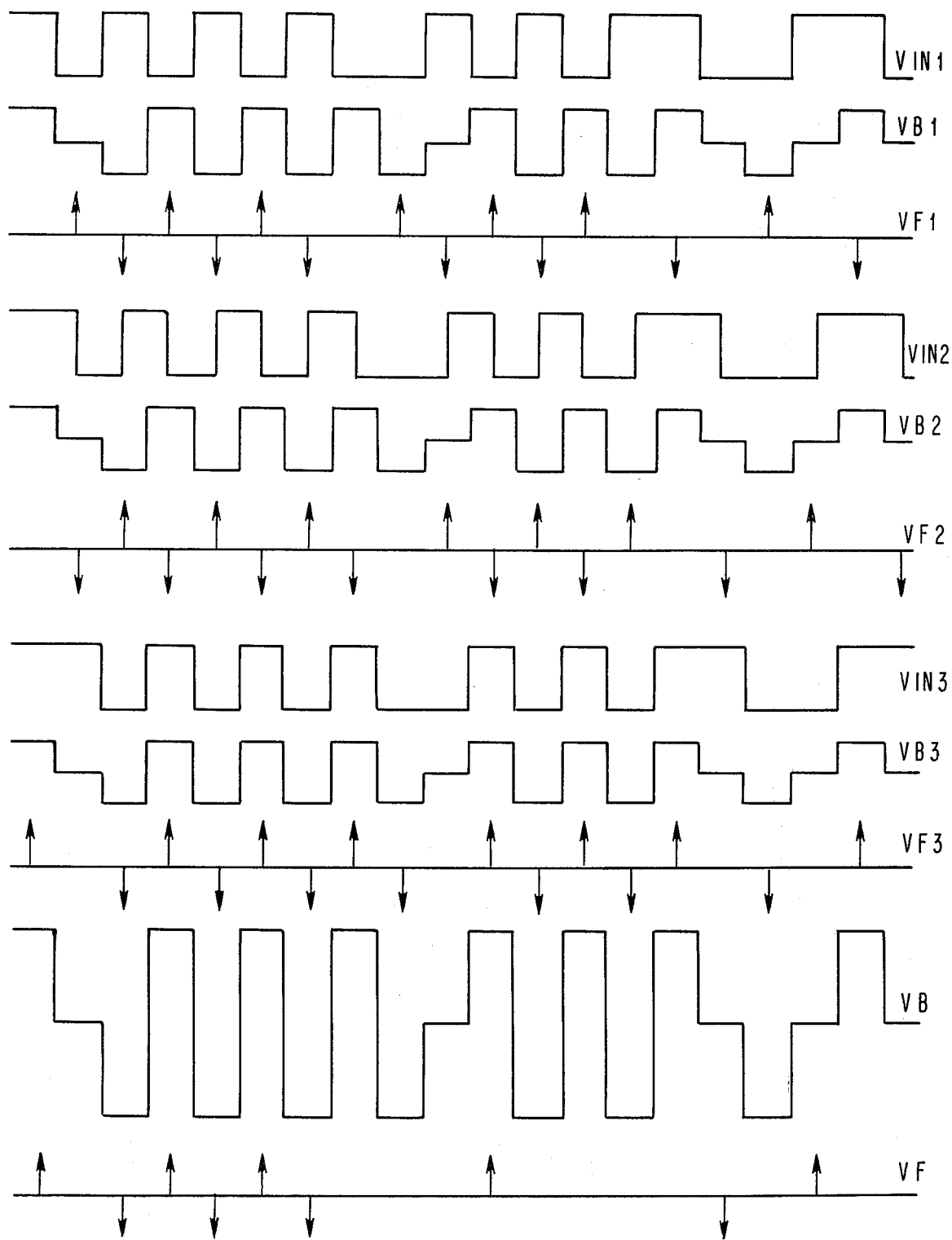
FIG. 11 shows the waveforms generated in the three coupler arrangement of FIG. 4 wherein the input is a non-periodic wave-form which represents a random data stream using a bi-frequency encoding.

FIG. 11 shows a non-periodic waveform which represents a random data stream using bi-frequency encoding. The directivity enhancement is achievable since the resultant forward waveform will be no greater than that of a single coupler, whereas the backward coupled waveform will be amplified in a manner previously described.

While the invention has been particularly shown and described with reference to preferred embodiment thereof, it will be understood by those skilled in the art that the various changes in form and detail may be made therein without departing from the spirit and scope of the invention.

What is claimed is:

1. In a data transmission system of the type using directional couplers to couple information to a two way transmission line wherein said couplers are connected to enhance the desired backward coupled signal and minimize the parasitic forward coupled signal comprising;

at least three directional couplers having fixed equal electrical characteristics and each having an input terminal, a backward coupled signal output terminal, a thru terminal and a forward coupled signal terminal;

signal input means connected to said input terminal of the first directional coupler of said at least three directional couplers;

a first minimum delay means connecting the thru terminal of each of said directional couplers except the last one to said input terminal of the succeeding directional coupler;

a second minimum delay means connecting the backward coupled signal terminal of each of said directional couplers except the last one to the forward coupled signal terminal of the succeeding directional coupler; and means for terminating said forward coupled signal terminal of said first coupler and the thru terminal and the backward coupled signal output terminal of the last coupler in a characteristic impedance of the line to which said terminals are connected, the backward coupled signal of each directional coupler arriving simultaneously at said backward coupled signal output terminal to produce an enhanced backward coupled signal at the backward coupled signal output terminal of the last coupler of said plurality of couplers and said parasitic forward coupled signals arriving at said forward terminal of the first directional coupler out of coincidence thereby minimizing said parasitic forward coupled signal.

2. A directional coupler system according to claim 1, wherein each of said at least three couplers include a pair of strip lines located sufficiently close to cause signal coupling therebetween when sandwiched between ground planes.

3. A directional coupler system according to claim 1, wherein said input signal means provides waveforms of a periodic nature and each of said at least three directional couplers have tuned to one-fourth of the wave length of said periodic waveforms.

4. A directional coupler system according to claim 1, wherein said first minimum delay means connecting the thru terminal of each of said directional couplers except the last one to said input terminal of the succeeding directional coupler is a good short electrical signal conductor so that the output at said thru terminal of a coupler essentially appears at the input terminal of the succeeding coupler with a minimum of delay.

5. A directional coupler arrangement according to claim 1, wherein said second minimum delay means connecting the backward coupled signal terminal of a coupler to the forward coupled signal terminal of the succeeding directional coupler is a short electrical signal conductor introducing a minimum delay to said backward coupled signal passing therethrough equal to the delay of said first minimum delay means.

6. A directional coupler arrangement according to claim 1, wherein said forward coupled signal terminal of said first coupler and the thru terminal and the backward coupled signal output terminal of the last coupler of said at least three directional couplers comprises a resistor connected to ground having a resistance equal to the characteristic impedance of lines connected thereto.

* * * * *